(12) United States Patent
Inoue et al.

(10) Patent No.: US 12,435,231 B2
(45) Date of Patent: Oct. 7, 2025

(54) WATER-BASED INK FOR INK-JET RECORDING, INK-JET RECORDING APPARATUS, INK-JET RECORDING METHOD AND INK STORING CONTAINER

(71) Applicant: BROTHER KOGYO KABUSHIKI KAISHA, Nagoya (JP)

(72) Inventors: Harumitsu Inoue, Toki (JP); Yuki Okumura, Iwakura (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 31 days.

(21) Appl. No.: 17/689,110

(22) Filed: Mar. 8, 2022

(65) Prior Publication Data
US 2022/0315784 A1    Oct. 6, 2022

(30) Foreign Application Priority Data
Mar. 31, 2021   (JP) .................. 2021-059640

(51) Int. Cl.
| | | |
|---|---|---|
| C09D 11/326 | (2014.01) | |
| B41J 2/175 | (2006.01) | |
| B41M 5/00 | (2006.01) | |
| C09D 11/033 | (2014.01) | |
| C09D 11/037 | (2014.01) | |
| C09D 11/107 | (2014.01) | |
| C09D 11/36 | (2014.01) | |

(52) U.S. Cl.
CPC ......... *C09D 11/326* (2013.01); *B41J 2/17503* (2013.01); *B41M 5/0023* (2013.01); *C09D 11/033* (2013.01); *C09D 11/037* (2013.01); *C09D 11/107* (2013.01); *C09D 11/36* (2013.01)

(58) Field of Classification Search
None
See application file for complete search history.

(56) References Cited

U.S. PATENT DOCUMENTS

| | | |
|---|---|---|
| 5,389,958 A | 2/1995 | Bui et al. |
| 5,500,476 A | 3/1996 | Neal et al. |
| 5,609,671 A | 3/1997 | Nagasawa |
| 5,837,045 A | 11/1998 | Johnson et al. |
| 8,759,417 B2 * | 6/2014 | Yatake .................. C09D 11/30 524/378 |

(Continued)

FOREIGN PATENT DOCUMENTS

| | | |
|---|---|---|
| EP | 3 587 516 A1 | 1/2020 |
| JP | H07-276621 A | 10/1995 |

(Continued)

OTHER PUBLICATIONS

Partial European Search Report issued in corresponding European Patent Application No. 22160512.4, Aug. 22, 2022.

(Continued)

*Primary Examiner* — Alejandro Valencia
(74) *Attorney, Agent, or Firm* — Merchant & Gould P.C.

(57) ABSTRACT

A water-based ink for ink-jet recording includes: a pigment, resin particles, a solvent and water, wherein the resin particles are resin particles of an acrylic-based polymer; and a storage elastic modulus E at 25° C. of an ink film, of the water-based ink for ink-jet recording, which is dried and solidified is not less than $9.7 \times 10^8$ Pa.

9 Claims, 1 Drawing Sheet

(56) References Cited

U.S. PATENT DOCUMENTS

| | | |
|---|---|---|
| 2006/0201380 A1 | 9/2006 | Kowalski et al. |
| 2007/0100023 A1 | 5/2007 | Burns et al. |
| 2007/0100024 A1 | 5/2007 | Gu et al. |
| 2008/0200718 A1 | 8/2008 | Hayes et al. |
| 2009/0220748 A1 | 9/2009 | Kanaya et al. |
| 2009/0229489 A1 | 9/2009 | Gu |
| 2011/0181675 A1* | 7/2011 | Takemoto .......... B41J 11/00244 347/102 |
| 2012/0262517 A1* | 10/2012 | Takaku ................ C09D 11/322 524/220 |
| 2015/0352836 A1 | 12/2015 | Kanasugi et al. |
| 2017/0130082 A1 | 5/2017 | Sekiguchi et al. |
| 2019/0177559 A1 | 6/2019 | Narihiro et al. |
| 2019/0283479 A1* | 9/2019 | Tamai .................. B41M 5/0023 |
| 2020/0002558 A1 | 1/2020 | Iwasaki et al. |
| 2020/0095440 A1* | 3/2020 | Shinohara ................ C08K 5/06 |
| 2020/0238730 A1* | 7/2020 | Kawakami ........... B41J 11/0015 |
| 2022/0119661 A1 | 4/2022 | Okumura |

FOREIGN PATENT DOCUMENTS

| | | |
|---|---|---|
| JP | 8-3498 A | 1/1996 |
| JP | 2000-513396 A | 10/2000 |
| JP | 2006-273892 A | 10/2006 |
| JP | 2007-153890 A | 6/2007 |
| JP | 2008-524400 | 7/2008 |
| JP | 2009-515007 | 4/2009 |
| JP | 2011-515535 | 5/2011 |
| JP | 2014-24941 A | 2/2014 |
| JP | 2014-173082 | 9/2014 |
| JP | 2016-13688 | 1/2016 |
| JP | 2017-218523 A | 12/2017 |
| JP | 2018-127545 A | 8/2018 |
| JP | 2019-126937 A | 8/2019 |
| JP | 2020-7524 | 1/2020 |
| WO | 97/48769 | 12/1997 |
| WO | 2006/066132 | 6/2006 |
| WO | 2007/053564 | 5/2007 |
| WO | 2009/117071 | 9/2009 |
| WO | 2020/241018 A1 | 12/2020 |
| WO | 2020/241196 A1 | 12/2020 |

OTHER PUBLICATIONS

Extended European Search Report issued in corresponding European Patent Application No. 22160512.4, Nov. 24, 2022.
Extended European Search Report issued in the corresponding European Patent Application No. 24167471.2, Jun. 6, 2024.

* cited by examiner

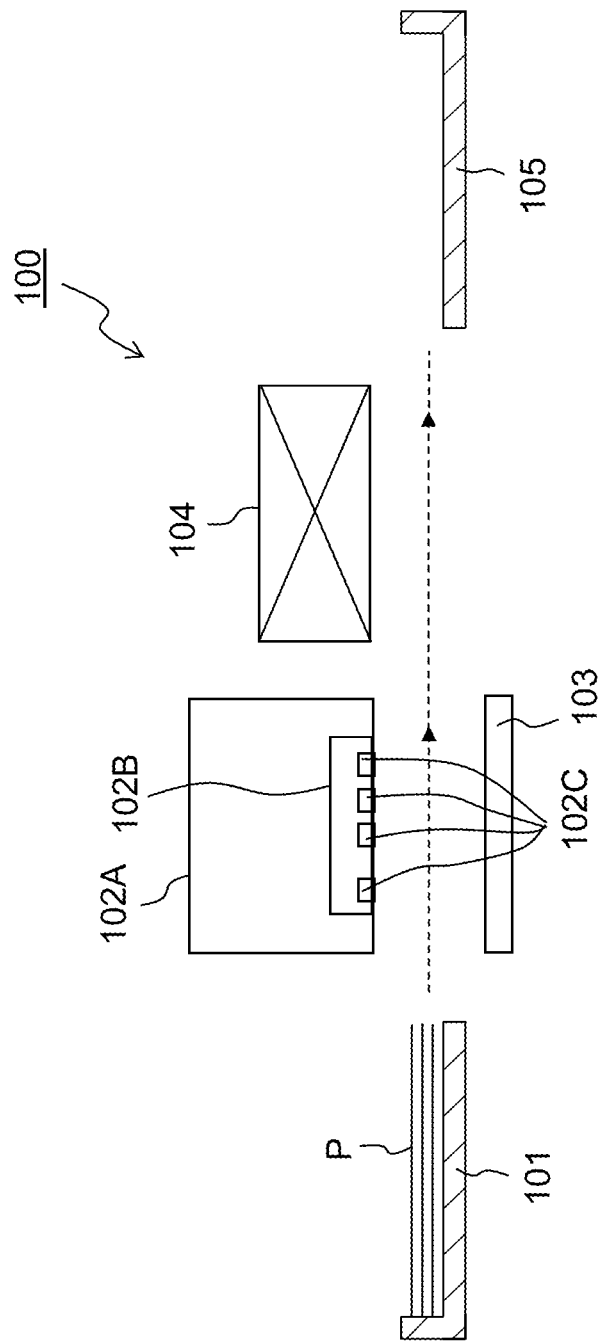

WATER-BASED INK FOR INK-JET RECORDING, INK-JET RECORDING APPARATUS, INK-JET RECORDING METHOD AND INK STORING CONTAINER

CROSS REFERENCE TO RELATED APPLICATION

The present application claims priority from Japanese Patent Application No. 2021-059640, filed on Mar. 31, 2021, the disclosure of which is incorporated herein by reference in its entirety.

BACKGROUND

The present disclosure relates to a water-based ink for ink-jet recording, an ink-jet recording apparatus, an ink-jet recording method and an ink storing container.

It is known that a water-based ink has a problem regarding the rubbing resistance (scratching resistance) that a part of a pigment discharged onto a recording medium remains on a surface of the recording medium and that the part of the pigment peels off from the recording medium when being rubbed or scratched by a finger, etc. As one of the solutions to this problem, a technique of adding a polymer to the water-based ink to thereby improve the rubbing resistance in the recording medium is known.

SUMMARY

In an ink-jet recording using a water-based ink for ink-jet recording, a higher image quality and a higher speed are required. With this, the water-based ink for ink-jet recording is required to have a further improved rubbing resistance at the time of recording on coated paper.

In view of the above-described situation, an object of the present disclosure is to provide a water-based ink for ink-jet recording improving the rubbing resistance at the time of the recording on the coated paper.

In order to achieve the above-described object, a water-based ink for ink-jet recording according to a first aspect includes: a pigment, resin particles, a solvent and water. The resin particles are resin particles of an acrylic-based polymer. A storage elastic modulus E at 25° C. of an ink film, of the water-based ink for ink-jet recording, which is dried and solidified is not less than $9.7 \times 10^8$ Pa.

A water-based ink for ink-jet recording according to a second aspect includes: a pigment, resin particles, a solvent and water. The resin particles are resin particles of an acrylic-based polymer of which a glass transition temperature is not less than 24° C. The solvent includes diol and glycol ether. The diol is at least one of 1,2-hexanediol and 1,6-hexanediol. The glycol ether includes dipropylene glycol monopropyl ether, and at least one of propylene glycol monopropyl ether and propylene glycol monobutyl ether.

In the water-based ink for ink-jet recording of first aspect, the storage elastic modulus E' at 25° C. of an ink film, of the water-based ink for ink-jet recording, which is dried and solidified is within the predetermined range, and the water-based ink for ink-jet recording includes the solvent in addition to the resin particles, thereby improving the rubbing resistance at the time of the recording on the coated paper. The water-based ink for ink-jet recording of the second aspect includes the resin particles of the acrylic-based polymer of which the glass transition temperature is not less than 24° C., and the solvent in which the specific diol and the specific glycol ether are combined, thereby improving the rubbing resistance at the time of the recording on the coated paper.

BRIEF DESCRIPTION OF THE DRAWINGS

The FIGURE is a schematic perspective view depicting the configuration of an example of an ink-jet recording apparatus of the present disclosure.

DETAILED DESCRIPTION

The water-based ink for ink-jet recording (hereinafter referred also to as a "water-based ink" or an "ink" in some cases) of the present disclosure will be explained. The water-based ink of the present disclosure includes a pigment, resin particles, a solvent, and water.

The pigment is not particularly limited, and is exemplified, for example, by carbon black, an inorganic pigment, an organic pigment, etc. The carbon black is exemplified, for example, by furnace black, lamp black, acetylene black, channel black, etc. The inorganic pigment is exemplified, for example, by titanium oxide, inorganic pigments based on iron oxide, inorganic pigments based on carbon black, etc. The organic pigment is exemplified, for example, by azo-pigments such as azo lake, insoluble azo-pigment, condensed azo-pigment, chelate azo-pigment, etc.; polycyclic pigments such as phthalocyanine pigment, perylene and perynon pigments, anthraquinone pigment, quinacridone pigment, dioxadine pigment, thioindigo pigment, isoindolinone pigment, quinophthalone pigment etc.; dye lake pigments such as basic dye type lake pigment, acid dye type lake pigment etc.; nitro pigment; nitroso pigment; aniline black daylight fluorescent pigment; and the like. Further, a pigment which is different from those as described above is usable, provided that the pigment is dispersible in a water phase. Specific examples of these pigments are exemplified, for example, by C. I. Pigment Blacks 1, 6, and 7; C. I. Pigment. Yellows 1, 2, 3, 12, 13, 14, 15, 16, 17, 55, 74, 78, 150, 151, 154, 180, 185, and 194; C. I. Pigment Oranges 31 and 43; C. I. Pigment Reds 2, 3, 5, 6, 7, 12, 15, 16, 48, 48:1, 53:1 57, 57:1, 112, 122, 123, 139, 144, 146, 149, 150, 166, 168, 175, 176, 177, 178, 184, 185, 190, 202, 209, 221, 222, 224 and 238; C. I. Pigment Violets 19 and 196; C. I. Pigment Blues 1, 2, 3, 15, 15:1, 15:2, 15:3, 15:4, 16, 22 and 60; C. I. Pigment Greens 7 and 36; and a solid solution of any one of the above-described pigments; etc.

A method of dispersing the above-described pigment by using the resin for dispersing pigment is exemplified, for example, by dispersing the pigment by using a dispersing apparatus. The dispersing apparatus used for dispersing the pigment is not particularly limited, provided that the dispersing apparatus is a general dispersing apparatus; the dispersing apparatus is exemplified, for example, by a ball mill, a roll mill, a sand mill (for example, a sand mill of a high-speed type), etc.

The pigment may be a self-dispersible pigment. The self-dispersible pigment is dispersible in water without using any dispersing agent, for example, owing to the situation that at least one of a hydrophilic functional group and a salt thereof including, for example, a carbonyl group, a hydroxyl group, a carboxylic acid group, a sulfonic acid group, and a phosphoric acid group is introduced into particles of a pigment by the chemical bond directly or with any group intervening therebetween. As the self-dispersible pigment, it is possible to use a self-dispersible pigment in which the pigment is subjected to a treatment by any one of methods described, for example, in Japanese Patent Application Laid-open No. 8-3498 corresponding to U.S. Pat. No. 5,609,671, Published Japanese Translation of PCT International Publication for Patent Application No. 2000-513396 corresponding to U.S. Pat. No. 5,837,045, Published Japanese Translation of PCT International Publication for Patent Application No. 2008-524400 corresponding to United States Patent Application Publication No. 2006/0201380, Published Japanese Translation of PCT International Publication for Patent Application No. 2009-515007 corresponding to United States Patent Application Publication Nos. 2007/0100024 and 2007/0100023, Published Japanese Translation of PCT International Publication for Patent Application No. 2011-515535 corresponding to United States Patent Application Publication No. 2009/0229489, etc. It is possible to use, as a material for the self-dispersible pigment, any one of the inorganic pigment and the organic pigment. Further, the pigment which is suitable to perform the treatment as described above is exemplified by carbon blacks including, for example, "MA8" (trade name) and "MA100" (trade name) produced by MITSUBISHI CHEMICAL CORPORATION, etc. As the self-dispersible pigment, it is allowable to use, for example, any commercially available product. The commercially available product includes, for example, "CAB-O-JET (a registered trade mark of CABOT CORPORATION) 200", "CAB-O-JET (registered trade mark) 250C", "CAB-O-JET (registered trade mark) 260M", "CAB-O-JET (registered trade mark) 270Y", "CAB-O-JET (registered trade mark) 300", "CAB-O-JET (registered trade mark) 400", "CAB-O-JET (registered trade mark) 450C", "CAB-O-JET (registered trade mark) 465M", and "CAB-O-JET (registered trade mark) 470Y" produced by CABOT CORPORATION; "BONJET (a registered trade mark of ORIENT CHEMICAL INDUSTRIES, LTD.) BLACK CW-2" and "BONJET (registered trade mark) BLACK CW-3" produced by ORIENT CHEMICAL INDUSTRIES, LTD.; and "LIOJET (a registered trade mark of TOYO INK MFG. CO., LTD.) WD BLACK 002C" produced by TOYO INK MFG. CO., LTD.; and the like.

A solid content blending amount of the pigment (pigment solid component amount) in the entire amount of the water-based ink is not particularly limited, and may be appropriately determined in accordance with, for example, a desired optical density, etc. The pigment solid component amount is, for example, in a range of 1% by weight to 10% by weight, in a range of 2% by weight to 8% by weight, or in a range of 3% by weight to 7% by weight. The pigment solid component amount is the weight only of the pigment, and does not include the weight of the resin dispersant, etc. (namely, conversion in an effective ingredient amount).

One kind of the pigment may be used singly, or not less than two kinds of the pigment may be used in combination.

The water is preferably ion-exchange water or purified water (pure water). A blending amount of the water with respect to the entire amount of the water-based ink (water ratio) is appropriately determined in accordance with a desired ink characteristic, etc. The water ratio may be, for example, a balance of the other components. The blending amount of the water is, for example, in a range of 60% by weight to 90% by weight, in a range of 65% by weight to 85% by weight, or in a range of 70% by weight to 80% by weight.

As described above, the water-based ink of the present disclosure further includes resin particles which are resin particles of the acrylic-based polymer, and the solvent.

In the water-based ink, for example, the lower limit value of a storage elastic modulus E' at 25° C. of an ink film, of the water-based ink, which is dried and solidified is not less than $9.7 \times 10^8$ Pa or not less than $2.1 \times 10^9$ Pa, the upper limit value of the storage elastic modulus E' at 25° C. is not more than $6.5 \times 10^9$ Pa or not more than $7.3 \times 10^9$ Pa. However, the upper limit value is merely an example, and the present disclosure is not limited to this; for example, the upper limited value may be not less than $7.3 \times 10^9$ Pa or not less than $1.0 \times 10^{10}$ Pa. Here, the term "storage elastic modulus E" is a parameter representing a hardness of a sample (ink film which is dried and solidified) in a tensile strength test. The storage elastic modulus E' can be measured, as a dynamic viscoelasticity, in accordance with Japanese Industrial Standards JIS K7244, Part 4: Tensile vibration—Non-resonance method.

A method of preparing the ink film is not particularly limited, and the ink film can be prepared, for example, by a method described in an example which will be described later on.

Further, a method of measuring the storage elastic modulus E' is not particularly limited, and the storage elastic modulus E' can be measured, for example, by a method described in the example which will be described later on.

In the water-based ink, the glass transition temperature (Tg) of the resin particles may be, for example, in a range of not less than 24° C. to less than 80° C. or in a range of not less than 49° C. to less than 80° C. From the viewpoint of the environmental temperature in a case of using the water-based ink of the present disclosure, the grass transition temperature (Tg) of the resin particles may be, for example, not less than the room temperature, specifically, in the range of not less than 24° C. to less than 80° C., in a range of not less than 30° C. to less than 80° C. or in the range of not less than 49° C. to less than 80° C.

The resin particles may be, for example, those included in a resin emulsion. The resin emulsion is composed, for example, of the resin particles and a dispersion medium (for example, water, etc.), wherein the resin particles are dispersed with respect to the dispersion medium with a specific particle diameter, not being in a dissolved state. As the resin particles, for example, a commercially available product of resin particles may be used. The resin particles are, for example, resin particles of which main component is polyacrylic acid or polyacrylate, and a monomer usable for forming the resin particles is exemplified by: (meth)acrylic acid, and (meth)acrylate such as methyl(meth)acrylate, ethyl (meth)acrylate, propyl(meth)acrylate, isopropyl(meth)acrylate, butyl(meth)acrylate, isobutyl (meth)acrylate, t-butyl (meth)acrylate, pentyl(meth)acrylate, 2-ethyhexyl(meth) acrylate, octyl(meth)acrylate, cyclopropyl(meth)acrylate, cyclopentyl(meth)acrylate, cyclohexyl(meth)acrylate, cycloheptyl(meth)acrylate, cyclooctyl(meth)acrylate, phenyl(meth)acrylate, benzyl(meth)acrylate, tolyl(meth)acrylate, xylyl(meth)acrylate, phenetyl(meth)acrylate, etc. One kind of the resin particles may be used singly, or not less than two kinds of the resin particles may be used in combination.

The commercially available product of the resin particles is exemplified, for example, by "MOWINYL (a registered trade mark of JAPAN COATING RESIN CO., LTD.) 6899D" (Tg: 49° C.; effective component concentration: 46% by weight), "MOWINYL (registered trade mark) 6800D" (Tg: 80° C.; effective component concentration: 43% by weight), "MOWINYL (registered trade mark) 5450" (Tg: 53° C.; effective component concentration: 20% by weight), "MOWINYL (registered trade mark) DM774" (Tg: 30° C.; effective component concentration: 46% by weight) manufactured by JAPAN COATING RESIN CO., LTD.;

"SAIVINOL (a registered trade mark of SAIDEN CHEMICAL INDUSTRY CO., LTD.) EK-61 (Tg: 24° C.; effective component concentration: 39% by weight), "SAIVINOL (registered trade mark) EK-1920 (Tg: 40° C.; effective component concentration: 35% by weight) manufactured by SAIDEN CHEMICAL INDUSTRY CO., LTD., etc.

In the water-based ink, a solid content blending amount (may be referred also to as an "conversion in the effective component amount") of the rein particles with respect to the entire amount of the water-based ink is not particularly limited, and can be appropriately determined. The solid content blending amount of the resin particles is, for example, in a range of 1% by weight to 10% by weight, in a range of 3% by weight to 7% by weight, or in a range of 4.3% by weight to 5.0% by weight. Note that in a case of using the resin emulsion including the resin particles, the term "conversion in the effective component amount" is, for example, the amount of the resin particles themselves, excluding the dispersion medium such as water, etc.

An average particle diameter of the resin particles is, for example, in a range of 5 nm to 500 nm, in a range of 20 nm to 300 nm, or in a range of 30 nm to 200 nm. The average particle diameter of the acrylic-based resin particles can be calculated as an arithmetic average diameter, for example, by using a dynamic light scattering particle diameter distribution measuring apparatus "LB-550" (trade name) manufactured by HORIBA, LTD.

In the water-based ink, the solvent includes both of the diol and the glycol ether. The diol is exemplified, for example, by: 1,2-hexanediol, 1,6-hexanediol, 1,2-heptanediol, 1,3-propanediol, 1,2-butanediol, 1,3-butanediol, 1,4-butanediol, 2,3-butanediol, 3-methyl-1,3-butanediol, 1,2-pentanediol, 1,5-pentanediol, 2-methyl-2,4-pentanediol, 3-methyl-L5-pentanediol, etc. As the solvent, one kind of the diol may be used singly, or not less than two kinds of the diol may be used in combination.

The glycol ether is exemplified, for example, by: dipropylene glycol monopropyl ether, propylene glycol monopropyl ether, propylene glycol monobutyl ether, ethylene glycol methyl ether, ethylene glycol ethyl ether, ethylene glycol-n-propyl ether, diethylene glycol methyl ether, diethylene glycol ethyl ether, diethylene glycol n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, tripropylene glycol-n-butyl ether, etc. As the solvent, one kind of the glycol ether may be used singly, or not less than two kinds of the glycol ether may be used in combination. A combination of not less than two kinds of the glycol ether is not particular limited, and may be determined appropriately. Specifically, for example, there is a combination of dipropylene glycol monopropyl ether, and at least one of propylene glycol monopropyl ether and propylene glycol monobutyl ether; etc.

As the solvent, it is allowable, for example, to use a commercially available product. The commercially available product is exemplified, for example, by: "DOWANOL (a registered trade mark of DOW CHEMICAL COMPANY) PM", "DOWANOL (registered trade mark) DPM", "DOWANOL (registered trade mark) TPM", "DOWANOL (registered trade mark) PnP", "DOWANOL (registered trade mark) DPnP", "DOWANOL (registered trade mark) PnB", "DOWANOL (registered trade mark) DPnB", "DOWANOL (registered trade mark) TPnB", manufactured by DOW CHEMICAL COMPANY, etc.

The blending amount of the solvent with respect to the entire amount of the water-based ink is not particular limited, and can be appropriately determined. The blending amount of the solvent is, for example, in a range of 3% by weight to 15% by weight, in a range of 5% by weight to 12% by weight, or in a range of 6% by weight to 10% by weight.

A blending amount (A) of the dipropylene glycol monopropyl ether, and a blending amount (B) of at least one of the propylene glycol monopropyl ether and the propylene glycol monobutyl ether may satisfy, for example, B/A 1 (hereinafter referred also to as a "condition X"). The blending amount (A) and the blending amount (B) may be adjusted appropriately so as to satisfy the condition X; and the blending amount (A) is, for example, in a range of 1% by weight to 15% by weight, in a range of 1% by weight to 10% by weight, or in a range of 1% by weight to 5% by weight; and the blending amount (B) is, for example, in a range of 1% by weight to 20% by weight, in a range of 1% by weight to 10% by weight, or in a range of 1% by weight to 5% by weight. Further, although the lower limit value of the condition X may be exemplified, for example, by: 0.8, 0.4, 0.2, etc., the lower limit value is not limited to this. For example, the lower limit value may be not more than 0.2, or not more than 0.1.

In the water-based ink, the storage elastic modulus E' is not less than $9.7 \times 10^8$ Pa, and the water-based ink includes: the resin particles which are resin particles of the acrylic-based polymer, and the solvent, and thus the water-based ink improves the rubbing resistance of the ink film formed on the coated paper by drying at a lower temperature and for a shorter period of time. The mechanism by which the rubbing resistance of the ink film formed on the coated paper is improved by the drying at a lower temperature and for a shorter period of time is presumed, for example, as follows. For the purpose of improving the rubbing resistance with respect to the coated paper, addition of the resin particles to the water-based ink is practiced generally. Resin particles which form a hard and strong coated film has a glass transition temperature (Tg) which is higher than the room temperature; accompanying with this, there is such a correlation that the minimum film forming temperature (a minimum temperature in a case that resin particles are fused to each other and become to be a film) is also higher than the room temperature. Accordingly, unless heating and drying at a temperature not less than the minimum film forming temperature are performed, a coated film by the water-based ink is formed on the coated paper in a state that the coated film is soft and fragile, namely, the rubbing resistance becomes to be low. As described above, the resin particles forming a hard and strong coated film, and the temperature and drying time can be considered to be the relationship of trade-off. In contrast, by adding the solvent to the water-based ink, the minimum film forming temperature of the resin particles is lowered, and thus it is possible to reach the minimum film forming temperature even by the heating at a low temperature and for a short period of time, thereby making it possible to form a hard and strong coated film, namely, to improve the rubbing resistance. Note that, however, this mechanism is merely a presumption, and the present disclosure is not limited to or restricted by this. Note that the temperature at the time of the drying will be explained in an ink-jet recording method of the present disclosure which will be descried later on.

On the other hand, depending on the combination of a certain kind of the resin particles and a certain kind of the solvent, there is such a problem that the viscosity of the water-based ink is varied over time, namely, the storage stability is lowered. It is considered that this problem occurs due to the solvent adhering to the surface of the resin particle and/or the solvent entering into the inside of the resin particles to thereby cause the resin particle to swell. As a result of this, the strength of the coated film is lowered, and the rubbing resistance is easily lowered. With respect to this, by adding the resin particles which are resin particles of the acrylic-based polymer to the water-based ink, the water-based ink is excellent both in the storage stability and the rubbing resistance. Further, for example, by the combination of the solvent and the resin particles by which the storage elastic modulus E at 25° C. of the ink film dried and solidified becomes to be not less than $9.7 \times 10^8$ Pa, the water-based ink is further excellent both in the storage stability and the rubbing resistance. Furthermore, for example, by the combination of the resin particles which are resin particles of the acrylic-based polymer and the solvent including both of the diol and the glycol ether, the water-based ink is further excellent both in the storage stability and the rubbing resistance. Note that, however, this mechanism is merely a presumption, and the present disclosure is not limited to or restricted by this.

Moreover, according to the water-based ink of the present disclosure, there is no need for a heating mechanism of a high output and/or a heating mechanism which perform heating for a long period of time, etc. Thus, the water-based ink of the present disclosure is applicable also to a small-sized printer. Further, for a similar reason, it is possible to make the ink-jet recording apparatus of the present disclosure to be small-sized. Furthermore, for a similar reason, it is possible to practice the ink-jet recording method of the present disclosure at a low cost.

Since the water-based ink of the present disclosure improves also the rubbing resistance (scratching resistance) of the ink film formed on the coated paper by the drying at a lower temperature and for a shorter period of time, a user is capable, for example, of safely performing printing using the water-based ink of the present disclosure.

The water-based ink may further include a water-soluble organic solvent which is different from the solvent. The water-soluble organic solvent is exemplified, for example, by a humectant which prevents the water-based ink from drying in a nozzle surface of the ink-jet head and a penetrant which adjusts the drying velocity on the recording medium.

The humectant is not particularly limited, and is exemplified, for example, by lower alcohols such as methyl alcohol, ethyl alcohol, n-propyl alcohol, isopropyl alcohol, n-butyl alcohol, sec-butyl alcohol, tert-butyl alcohol, etc.; amides such as dimethylformamide, dimethylacetamide, etc.; ketones such as acetone, etc.; ketoalcohols (ketone alcohols) such as diacetone alcohol, etc.; ethers such as tetrahydrofuran, dioxane, etc.; polyethers such as polyalkylene glycol, etc.; polyvalent alcohols such as alkylene glycol, glycerol, trimethylolpropane, trimethylolethane, etc.; 2-pyrrolidone; N-methyl-2-pyrrolidone; 1,3-dimethyl-2-imidazolidinone; and the like. The polyalkylene glycol is exemplified, for example, by polyethylene glycol, polypropylene glycol, etc. The alkylene glycol is exemplified, for example, by ethylene glycol, propylene glycol, butylene glycol, diethylene glycol, triethylene glycol, dipropylene glycol, tripropylene glycol, thiodiglycol, hexylene glycol, etc. It is allowable that one kind of the humectant as described above is used singly, or not less than two kinds of the humectant are used in combination. Among the above-described humectants, the humectant is preferably a polyvalent alcohol such as alkylene glycol, glycerol, etc.

The blending amount of the humectant in the entire amount of the water-based ink is, for example, in a range of 0% by weight to 95% by weight, in a range of 5% by weight to 80% by weight, or in a range of 5% by weight to 50% by weight.

The penetrant preferably includes at least one of alkylene-based diol and a glycol ether-based compound. The alkylene-based diol is exemplified, for example, by: 1,2-hexanediol, 1,2-heptanediol, 1,3-propanediol, 1,2-butanediol, 1,3-butanediol, 1,4-butanediol, 2,3-butanediol, 3-methyl-1,3-butanediol, 1,2-pentanediol, 1,5-pentanediol, 1,6-hexanediol, 2-methyl-2,4-pentanediol, 3-methyl-1,5-pentanediol, etc. The glycol ether-based compound is exemplified, for example, by: ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, tripropylene glycol-n-butyl ether, etc. One kind of the penetrant may be used singly, or not less than two kinds of the penetrant may be used in combination.

The blending amount of the penetrant with respect to the entire amount of the water-based ink is, for example, in a range of 0% by weight to 20% by weight, in a range of 0% by weight to 15% by weight, or in a range of 1% by weight to 6% by weight.

The water-based ink may further include a conventionally known additive, as necessary. The additive is exemplified, for example, by surfactants, pH-adjusting agents, viscosity-adjusting agents, surface tension-adjusting agents, fungicides, etc. The viscosity-adjusting agents are exemplified, for example, by polyvinyl alcohol, cellulose, water-soluble resin, etc.

Next, an ink storing container of the present disclosure is an ink storing container including a water-based ink for ink-jet recording, wherein the water-based ink is the water-based ink for ink-jet recording of the present disclosure. The ink storing container is exemplified, for example, by an ink cartridge, a tank, a pouch, etc. It is allowable to use, as the body of the ink storing container, a conventionally known body for an ink storing container.

Next, an ink-jet recording apparatus and an ink-jet recording method of the present disclosure will be explained.

The ink-jet recording apparatus of the present disclosure is an ink-jet recording apparatus characterized by including: an ink storing section, and an ink discharging mechanism; the ink-jet recording apparatus being configured to discharge an ink stored in the ink storing section by the ink discharging mechanism, the ink-jet recording apparatus further including a drying mechanism configured to heat and dry a record part by the ink discharged by the ink discharging mechanism; wherein the water-based ink for ink-jet recording of the present disclosure is stored in the ink storing section. Here, the term "record part" means not only a part (area), of the recording medium, to which the ink discharged by the ink recording mechanism is adhered, but also a part (area), of the recording medium, before the ink is adhered thereto, namely, a part (area), of the recording medium, in which an image is to be recorded. In the record part in the former meaning, the ink adhered onto the recording medium is directly heated by the heating mechanism and is dried. In the record part in the latter meaning, since the recording medium is heated first or previously, the ink adhered to the recording medium is consequently heated through the recording medium which has been heated.

The drying mechanism may, for example, apply an amount of heat in a range of not less than 44 J/cm$^3$ to not more than 131 J/cm$^3$ to the record part by the ink. In other words, the drying mechanism can also be considered to apply, with respect to 1 cm$^3$ of the ink, an amount of heat for raising the temperature by a range of 10° C. to 30° C. With this, it is possible to perform formation of an image stably and with a high quality.

The ink-jet recording method of the present disclosure is characterized by including: a recording step of performing recording on a recording medium by discharging a water-based ink onto the recording medium in accordance with an ink-jet system; and a fixing step of fixing, to the recording medium, the water-based ink adhered to the recording medium in the recording step, by use of a drying mechanism configured to heat and dry a record part of the recording medium, wherein the water-based ink for ink-jet recording of the present disclosure is used, as the water-based ink, in the recording step.

In the ink-jet recording method of the present disclosure, for example, in the fixing step, it is allowable to apply an amount of heat in a range of not less than 44 J/cm$^3$ to not more than 131 J/cm$^3$ to the record part by the ink. In other words, the ink-jet recording method of the present disclosure can be considered to apply, with respect to 1 cm$^3$ of the ink, an amount of heat for raising the temperature by a range of 10° C. to 30° C., in the fixing step. With this, it is possible to perform formation of an image stably and with a high quality.

In the ink-jet recording method of the present disclosure, the recording medium is exemplified, for example, by the coated paper (coated paper sheet), etc. In the present disclosure, the term "coated paper" means, for example, high quality printing paper, medium quality printing paper, etc., which is plain paper having a pulp as a constituent element thereof and having a coating agent applied thereon for a purpose of improving the smoothness, whiteness, glossiness, etc.; specifically, the coated paper is exemplified by high quality coated paper, medium quality coated paper, etc. Although the water-based ink and the ink-jet recording method of the present disclosure are suitably usable for ink-jet recording on the coated paper; the usage of the water-based ink and the ink-jet recording method is not limited to the recording on the coated paper; it is possible to use the water-based ink and the ink-jet recording method also for ink-jet recording with respect to a recording medium which is different from the coated paper and which includes, for example, plain paper, glossy paper, mat paper, synthetic paper, heat transfer paper, thermosensitive paper, cardboard (paperboard), corrugated cardboard, film, etc.

The ink-jet recording method of the present disclosure can be carried out, for example, by using the ink-jet recording apparatus of the present disclosure. The recording includes printing a letter (text), printing an image, printing, etc.

The FIGURE is a schematic view of the configuration of an example of the ink-jet recording apparatus of the present disclosure. As depicted in the FIGURE, an ink-jet recording apparatus 100 includes a paper feed tray 101, a conveying mechanism such as a roller, etc., (not depicted in the drawing), a recording mechanism, a platen 103, a drying mechanism 104, a paper discharge tray 105 and an ink storing section such as an ink cartridge or an ink tank, etc., (not depicted in the drawing). Further, the ink-jet recording apparatus of the present disclosure may be provided, for example, with a maintenance unit (not depicted in the drawing). The paper feed tray 101 is capable of supporting a plurality of pieces of a recording medium (for example, coated paper) P which are stacked.

A conveying route (not depicted in the drawing) is formed, by a guide member, in the inside of the ink-jet recording apparatus 100. The recording paper P is conveyed from the paper feed tray 101 toward the paper discharge tray 105 by the conveying mechanism and via the conveying route, as indicated by an arrow in a broken line in the FIGURE.

The recording mechanism includes a carriage 102A and an ink-jet head (ink discharging mechanism) 102B. The carriage 102A is supported by two guide rails (not depicted in the drawing) which are provided to extend perpendicularly to a conveying direction in which the recording paper P is conveyed. The two guide rails are supported by a casing (not depicted in the drawing) of the ink-jet recording apparatus 100. The carriage 102A is connected to a publicly known belt mechanism (not depicted in the drawing) provided on the two guide rails. The belt mechanism is driven by a carriage motor (not depicted in the drawing). The carriage 102A connected to the belt mechanism moves reciprocally in a direction perpendicular to the conveying direction of the recording paper P, by driving of the carriage motor.

Further, four ink tubes (not depicted in the drawing) connecting the ink storing section and the ink-jet head 102B and a flexible flat cable (not depicted in the drawing) electrically connecting the ink-jet head 102B and a control substrate (not depicted in the drawing) are provided to extend from the carriage 102A. The four ink tubes supply four color water-based inks which are yellow, magenta, cyan and black inks and which are stored in the ink storing section to the ink-jet head 102B. At least one of the four color water-based inks is the water-based ink for ink-jet recording of the present disclosure. The flexible flat cable transmits a control signal outputted form the control substrate to the ink-jet head 102B.

As depicted in the FIGURE, the ink-jet head 102B is mounted on the carriage 102A. A plurality of nozzles 102C are formed in a lower surface of the ink-jet head 102B. Forward ends of the plurality of nozzles 102C are exposed from the carriage 102A and the lower surface of the ink-jet head 102B. The ink-jet head 102B has an actuator (not depicted in the drawing) configured to apply a force for discharging or ejecting the water-based ink(s) supplied from the ink storing section to the ink-jet head 102B via the ink tube(s). The actuator may be of any system including the piezoelectric element system, the thermal ink system, the electrostatic attraction system, etc. In a process in which the carriage 102A moves reciprocally in the direction perpendicular to the conveying direction of the recording paper P, the ink-jet head 102B discharges or ejects the water-based ink(s) as fine ink droplets from the plurality of nozzles 102C onto the recording paper P. With this, an image is recorded on the recording paper P. The platen 103 is arranged to face or to be opposite to the recording mechanism, and supports the recording paper P which is (being) conveyed from the paper feed tray 101. Note that although an ink-jet head of a serial type is adopted in the apparatus depicted in the FIGURE, the present disclosure is not limited to this. It is allowable that the ink-jet recording apparatus is an apparatus adopting an ink-jet head of a line type or an roll to roll system.

The drying mechanism 104 heats and dries the record part of the recording paper P. The temperature on the recording paper P at the time of drying may be, for example, a temperature in a range of 0.1 times to 10 times, in a range of 0.2 times to 8 times, or in a range of 0.5 times to 5 times the Tg of the acrylic-based resin particles. The temperature can be appropriately adjusted by changing the setting of the drying mechanism 104; specifically, the temperature is, for example, in a range of 0° C. to 400° C., in a range of 5° C. to 350° C. or in a range of 10° C. to 250° C. Further, the time of the drying (drying time) can also be appropriately adjusted by changing the setting of the drying mechanism 104; the drying time, for example, exceeds 0 seconds and is not more than 300 seconds, is in a range of 0.05 second to 60 seconds, or is in a range of 0.07 second to 30 seconds. The water-based ink of the present disclosure improves the scratching resistance of the ink film formed on the coater paper by drying at a lower temperature and for a shorter period of time, as compared with a conventional water-based ink which requires heating and drying at a high temperature and for a long period of time. The drying mechanism 104 may be any mechanism provided that the mechanism is capable of heating and drying the record part. Further, the heating system by the drying mechanism 104 is not particularly limited, and may be any system including, for example, the heat transfer, convection, radiation, etc. The drying mechanism 104 is exemplified, for example, by commercially available dryer (warm air), oven, belt conveyor oven, iron, hot press, plate heater, IR heater, etc.; the drying mechanism 104 is preferably a non-contact type drying mechanism which is configured to heat and dry the record part of the recording paper P without making contact with the record part, such as the dryer, oven, belt-conveyor oven, etc.

In the apparatus depicted in the FIGURE, an example in which the record part of the recording paper P is heated and dried by the drying mechanism 104 arranged on the side of the ink-jet head 102B so as to face the record part of the recording paper P. The present disclosure, however, is not limited to this. The drying mechanism 104 may be a mechanism capable of heating and drying the record part of the recording paper P, and may be arranged on a side opposite to the record part of the recording paper P, namely, on a side facing the nozzles 102C of the ink-jet head 102B. In the apparatus depicted in the FIGURE, although the drying mechanism 104 is arranged on the downstream side in the conveying direction with respect to the ink-jet head 102B, it is allowable to arrange the heating mechanism 104 on the upstream side in the conveying direction with respect to the recording head 102B so as to heat the record part before the ink lands on the record part.

The recording paper P after the recording and drying have been performed therefor is conveyed to the paper discharge tray 105. According to the present disclosure, it is possible to improve the rubbing resistance of the ink film recorded on the recording paper P, without requiring any complex configuration.

Next, the maintenance unit will be explained. The maintenance unit is provided with a waste liquid foam (not depicted in the drawing), a cap (not depicted in the drawing), a tube (not depicted in the drawing) and a pump (not depicted in the drawing) which are arranged on one side in the scanning direction with respect to the platen 103. Further, a wipe member (not depicted in the drawing) is arranged to be adjacent to the maintenance unit, on a location of the maintenance unit on the side of the platen 103. The wipe member is formed to have a spatula shape, and configured to wipe forward end parts of the nozzles 102C of the ink-jet head 102B (also referred to as an ink discharge surface), accompanying with the movement of the carriage 102A.

EXAMPLES

Next, Examples of the present disclosure will be explained together with Comparative Examples. Note that the present disclosure is not limited to or restricted by Examples and Comparative Examples described below.
(Preparation of Aqueous Pigment Dispersion A)

Pure water (purified water) was added to 20% by mass of a pigment (carbon black) and 7% by mass of sodium hydroxide-neutralized product of styrene-acrylic acid copolymer (acid value: 175 mgKOH/g, molecular weight: 10000) so that the entire amount thereof was 100% by mass, followed by being agitated and mixed, and thus a mixture was obtained. The obtained mixture was placed in a wet sand mill charged with zirconia beads of which diameter was 0.3 mm, and was subjected to a dispersing process for 6 (six) hours. Afterwards, the zirconia beads were removed by a separator, and the mixture was filtrated through a cellulose acetate filter (pore size 3.0 μm). Thus, aqueous pigment dispersion (water pigment dispersion) A was obtained. Note that the styrene-acrylic acid copolymer is a water-soluble polymer which is generally used as a dispersant for pigment (pigment dispersant).

Examples 1 to 11 and Comparative Examples 1 to 11

Components, which were included in Water-based Ink Composition (TABLE 1) and which were different from the aqueous pigment dispersion A were mixed uniformly or homogeneously; and thus an ink solvent was obtained. Subsequently, the obtained ink solvent was added to the aqueous pigment dispersion A, followed by being mixed uniformly, and thus a mixture was obtained. After that, the obtained mixture was filtrated through a cellulose acetate membrane filter (pore size 3.00 μm) produced by TOYO ROSHI KAISHA, LTD., and thus a water-based ink for ink jet recording of each of Examples 1 to 11 and Comparative Examples 1 to 11 was obtained.
(Method of Producing Ink Film)

The ink was dripped into a petri dish made of "Teflon" (a registered trademark of the Chemours Company), was dried for 6 hours in a thermostatic bath at 100° C., and thus an ink film of which average thickness was 0.4 mm was obtained. This ink film was cut further into a rectangular shape of 10 mm width, as a test piece provided for the measurement of storage elastic modulus E'.
(Method of Measuring Storage Elastic Module E')

First, the test piece was set in a dynamic viscoelasticity measuring apparatus ("RSA-G2" (trade name) manufactured by TA Instruments), then was cooled up to −60° C. After the temperature of the test piece reached −60° C., the dynamic viscoelasticity was measured under the following measuring condition. The obtained measurement data was made as a "storage elastic module E' at 25° C.".

Range of measuring temperature: −60° C. to 100° C.
Rate of temperature increase: 2.5° C./min
Frequency: 10 Hz Initial strain: 0.1%
Distance between clamps: 10 mm With respect to the water-based inks of Examples 1 to 11 and Comparative Examples 1 to 11, respectively, (a) Evaluation of the rubbing resistance of the ink film recorded on the coated paper and (b) Evaluation of storage stability were performed by the following methods.

(a) Evaluation of the Rubbing Resistance of the Ink Film Recorded on the Coated Paper A plate heater of the contact type was used so as to heat coated paper ("OK TOP COAT+(trade name)" produced by OJI PAPER CO., LTD.) until the surface temperature of the coated paper reached 50° C. Note that the surface temperature was measured with a thermometer of the non-contact type. Next, an ink-jet printer MFC-J6995CDW (trade name) produced by BROTHER INDUSTRIES, LTD., was used so as to record a solid image on the coated paper with each of the water-based inks of Examples and Comparative Examples. Next, after elapse of 1 (one) second since the paper discharge, a cotton swab was used so as to rub a surface of the solid image under a condition of load: 1 kg. Afterward, the optical density (OD value) at three locations in the solid image was measured by using a spectrophotometric colorimetry meter "SpectroEye" (trade name) produced by X-RITE INC. (light source: $D_{50}$, field angle: 2°, ANSI-T), the average value was obtained, and the evaluation of the optical density (OD value) on the coated paper was performed therefor in accordance with the following criterion for evaluation.

<Criterion for Evaluation of the Rubbing Resistance of the Ink Film Recorded on the Coated Paper>

A: The decreasing rate of the optical density (OD value) from the time at which the surface of the solid image had not been rubbed yet was not more than 5%.

B: The decreasing rate of the optical density (OD value) from the time at which the surface of the solid image had not been rubbed yet exceeded 5% and was not more than 10%.

C: The decreasing rate of the optical density (OD value) from the time at which the surface of the solid image had not been rubbed yet exceeded 10%.

(b) Evaluation of Storage Stability

Immediately after that the water-based ink of each of Examples and Comparative Examples was prepared and the viscosity thereof was measured, the water-based ink was placed in a sealed container, and was stored for two weeks in an environment of 60° C. Thus, an evaluation sample was prepared. The viscosity of the evaluation sample prepared in such a manner was measured, and the evaluation of the storage stability was performed therefor in accordance with the following criterion for evaluation. The viscosity was measured at 25° C. by using a viscometer of a cone-plate system "TVE-25" (trade name) produced by TOKI SANGYO CO., LTD.

<Criterion for Evaluation of Storage Stability>

A: In the evaluation sample, the change rate of viscosity since immediately after the preparation was not more than 5%.

B: In the evaluation sample, the change rate of viscosity since immediately after the preparation exceeded 5% and was not more than 10%.

C: In the evaluation sample, the change rate of viscosity since immediately after the preparation exceeded 10%.

The water-based ink composition and the results of evaluations of each of the water-based inks of Examples 1 to 11 and Comparative Examples 1 to 11 are indicated in TABLE 1.

TABLE 1

| | | | | EXAMPLES | | | | | |
|---|---|---|---|---|---|---|---|---|---|
| | | | Tg (° C.) | 1 | 2 | 3 | 4 | 5 | 6 |
| Water-based Ink Composition (% by weight) | Colorant | Aqueous pigment dispersion A (*1) | | 5.0 | 5.0 | 5.0 | 5.0 | 5.0 | 5.0 |
| | Resin Particles | MOWINYL 6899D (*2) | 49 | 10.9 | — | — | — | — | 10.9 |
| | | MOWINYL 6800D (*3) | 80 | — | 11.6 | — | — | — | — |
| | | MOWINYL 5450 (*4) | 53 | — | — | 24.9 | — | — | — |
| | | MOWINYL DM774 (*5) | 30 | — | — | — | 10.7 | — | — |
| | | SAIVINOL EK-61 (*6) | 24 | — | — | — | — | 12.7 | — |
| | | JSR 0695 (*7) | −4 | — | — | — | — | — | — |
| | | ADEKA BONTIGHER HUX-370 (*8) | 100 | — | — | — | — | — | — |
| | | SAIVINOL EC-2020 (*9) | 17 | — | — | — | — | — | — |
| | | MOWINYL DM772 (*10) | 22 | — | — | — | — | — | — |
| | Solvent | 1,2-hexanediol | | 5.0 | 5.0 | 5.0 | 5.0 | 5.0 | — |
| | | 1,6-hexanediol | | — | — | — | — | — | 5.0 |
| | | 1,2-pentanediol | | — | — | — | — | — | — |
| | | propylene glycol | | — | — | — | — | — | — |
| | | dipropylene glycol monopropyl ether (A) | | 2.0 | 2.0 | 2.0 | 2.0 | 2.0 | 2.0 |
| | | butyl triglycol | | — | — | — | — | — | — |
| | | tripropylene glycol monomethyl ether | | — | — | — | — | — | — |
| | | propylene glycol monobutyl ether (B) | | 2.0 | 2.0 | 2.0 | 2.0 | 2.0 | 2.0 |
| | | propylene glycol monopropyl ether (B) | | — | — | — | — | — | — |
| | | dipropylene glycol monobutyl ether | | — | — | — | — | — | — |
| | | tripropylene glycol monobutyl ether | | — | — | — | — | — | — |
| | | Water | | balance | balance | balance | balance | balance | balance |
| | | B/A | | 1.0 | 1.0 | 1.0 | 1.0 | 1.0 | 1.0 |
| | | Storage elastic modulus E' (Pa) | | $4.1 \times 10^9$ | $7.3 \times 10^9$ | $6.5 \times 10^9$ | $2.3 \times 10^9$ | $1.7 \times 10^9$ | $3.3 \times 10^9$ |
| | | Rubbing resistance | | A | A | A | A | B | A |
| | | Storage stability | | A | A | A | B | B | A |

TABLE 1-continued

|  |  |  | Tg (° C.) | EXAMPLES | | | | |
|---|---|---|---|---|---|---|---|---|
|  |  |  |  | 7 | 8 | 9 | 10 | 11 |
| Water-based Ink Composition (% by weight) | Colorant: Resin Particles | Aqueous pigment dispersion A (*1) |  | 5.0 | 5.0 | 5.0 | 5.0 | 5.0 |
|  |  | MOWINYL 6899D (*2) | 49 | 10.9 | 10.9 | 9.2 | 9.8 | 10.1 |
|  |  | MOWINYL 6800D (*3) | 80 | — | — | — | — | — |
|  |  | MOWINYL 5450 (*4) | 53 | — | — | — | — | — |
|  |  | MOWINYL DM774 (*5) | 30 | — | — | — | — | — |
|  |  | SAIVINOL EK-61 (*6) | 24 | — | — | — | — | — |
|  |  | JSR 0695 (*7) | −4 | — | — | — | — | — |
|  |  | ADEKA BONTIGHER HUX-370 (*8) | 100 | — | — | — | — | — |
|  |  | SAIVINOL EC-2020 (*9) | 17 | — | — | — | — | — |
|  |  | MOWINYL DM772 (*10) | 22 | — | — | — | — | — |
|  | Solvent | 1,2-hexanediol |  | — | 5.0 | 5.0 | 5.0 | 3.0 |
|  |  | 1,6-hexanediol |  | 5.0 | 1.0 | — | — | — |
|  |  | 1,2-pentanediol |  | — | — | — | — | — |
|  |  | propylene glycol |  | — | — | — | — | — |
|  |  | dipropylene glycol monopropyl ether (A) |  | 2.0 | 2.0 | 2.0 | 2.0 | 2.0 |
|  |  | butyl triglycol |  | — | — | — | — | — |
|  |  | tripropylene glycol monomethyl ether |  | — | — | — | — | — |
|  |  | propylene glycol monobutyl ether (B) |  | — | 2.0 | 2.0 | 1.0 | 1.5 |
|  |  | propylene glycol monopropyl ether (B) |  | 2.0 | — | — | — | — |
|  |  | dipropylene glycol monobutyl ether |  | — | — | — | — | — |
|  |  | tripropylene glycol monobutyl ether |  | — | — | — | — | — |
|  |  | Water |  | balance | balance | balance | balance | balance |
|  |  | B/A |  | 1.0 | 1.0 | 1.0 | 0.5 | 0.8 |
|  |  | Storage elastic modulus E' (Pa) |  | $2.5 \times 10^9$ | $2.7 \times 10^9$ | $1.2 \times 10^9$ | $9.7 \times 10^8$ | $2.1 \times 10^9$ |
|  |  | Rubbing resistance |  | A | A | B | B | A |
|  |  | Storage stability |  | A | A | A | A | A |

|  |  |  | Tg (° C.) | COMPARATIVE EXAMPLES | | | | | |
|---|---|---|---|---|---|---|---|---|---|
|  |  |  |  | 1 | 2 | 3 | 4 | 5 | 6 |
| Water-based Ink Composition (% by weight) | Colorant: Resin Particles | Aqueous pigment dispersion A (*1) |  | 5.0 | 5.0 | 5.0 | 5.0 | 5.0 | 5.0 |
|  |  | MOWINYL 6899D (*2) | 49 | — | — | — | — | 7.6 | 10.9 |
|  |  | MOWINYL 6800D (*3) | 80 | — | — | — | — | — | — |
|  |  | MOWINYL 5450 (*4) | 53 | — | — | — | — | — | — |
|  |  | MOWINYL DM774 (*5) | 30 | — | — | — | — | — | — |
|  |  | SAIVINOL EK-61 (*6) | 24 | — | — | — | — | — | — |
|  |  | JSR 0695 (*7) | −4 | 9.9 | — | — | — | — | — |
|  |  | ADEKA BONTIGHER HUX-370 (*8) | 100 | — | 14.8 | — | — | — | — |
|  |  | SAIVINOL EC-2020 (*9) | 17 | — | — | 12.0 | — | — | — |
|  |  | MOWINYL DM772 (*10) | 22 | — | — | — | 10.7 | — | — |
|  | Solvent | 1,2-hexanediol |  | 5.0 | 5.0 | 5.0 | 5.0 | 5.0 | — |
|  |  | 1,6-hexanediol |  | — | — | — | — | — | — |
|  |  | 1,2-pentanediol |  | — | — | — | — | — | 5.0 |
|  |  | propylene glycol |  | — | — | — | — | — | — |
|  |  | dipropylene glycol monopropyl ether (A) |  | 2.0 | 2.0 | 2.0 | 2.0 | — | 2.0 |
|  |  | butyl triglycol |  | — | — | — | — | 3.0 | — |
|  |  | tripropylene glycol monomethyl ether |  | — | — | — | — | — | — |
|  |  | propylene glycol monobutyl ether (B) |  | 2.0 | 2.0 | 2.0 | 2.0 | 2.0 | 2.0 |
|  |  | propylene glycol monopropyl ether (B) |  | — | — | — | — | — | — |
|  |  | dipropylene glycol monobutyl ether |  | — | — | — | — | — | — |
|  |  | tripropylene glycol monobutyl ether |  | — | — | — | — | — | — |
|  |  | Water |  | balance | balance | balance | balance | balance | balance |
|  |  | B/A |  | 1.0 | 1.0 | 1.0 | 1.0 | 1.0 | 1.0 |
|  |  | Storage elastic modulus E' (Pa) |  | $1.5 \times 10^8$ | $9.5 \times 10^8$ | $2.0 \times 10^8$ | $8.8 \times 10^8$ | $6.1 \times 10^8$ | $1.7 \times 10^8$ |
|  |  | Rubbing resistance |  | C | C | C | C | C | C |
|  |  | Storage stability |  | C | C | A | B | B | B |

|  |  |  | Tg (° C.) | COMPARATIVE EXAMPLES | | | | |
|---|---|---|---|---|---|---|---|---|
|  |  |  |  | 7 | 8 | 9 | 10 | 11 |
| Water-based Ink Composition (% by weight) | Colorant Resin Particles | Aqueous pigment dispersion A (*1) |  | 5.0 | 5.0 | 5.0 | 6.0 | 7.0 |
|  |  | MOWINYL 6899D (*2) | 49 | 10.9 | 10.9 | 10.9 | 10.9 | 10.9 |
|  |  | MOWINYL 6800D (*3) | 80 | — | — | — | — | — |
|  |  | MOWINYL 5450 (*4) | 53 | — | — | — | — | — |
|  |  | MOWINYL DM774 (*5) | 30 | — | — | — | — | — |
|  |  | SAIVINOL EK-61 (*6) | 24 | — | — | — | — | — |
|  |  | JSR 0695 (*7) | −4 | — | — | — | — | — |
|  |  | ADEKA BONTIGHER HUX-370 (*8) | 100 | — | — | — | — | — |
|  |  | SAIVINOL EC-2020 (*9) | 17 | — | — | — | — | — |
|  |  | MOWINYL DM772 (*10) | 22 | — | — | — | — | — |
|  | Solvent | 1,2-hexanediol |  | — | 5.0 | 5.0 | 5.0 | 5.0 |
|  |  | 1,6-hexanediol |  | — | — | — | — | — |
|  |  | 1,2-pentanediol |  | — | — | — | — | — |
|  |  | propylene glycol |  | 5.0 | — | — | — | — |

TABLE 1-continued

| | | | | | |
|---|---|---|---|---|---|
| dipropylene glycol monopropyl ether (A) | 2.0 | — | — | 2.0 | 2.0 |
| butyl triglycol | — | 2.0 | — | — | — |
| tripropylene glycol monomethyl ether | — | — | 2.0 | — | — |
| propylene glycol monobutyl ether (B) | 2.0 | 2.0 | 2.0 | — | — |
| propylene glycol monopropyl ether (B) | — | — | — | — | — |
| dipropylene glycol monobutyl ether | — | — | — | 2.0 | — |
| tripropylene glycol monobutyl ether | — | — | — | — | 2.0 |
| Water | balance | balance | balance | balance | balance |
| B/A | 1.0 | — | — | — | — |
| Storage elastic modulus E' (Pa) | $4.6 \times 10^8$ | $2.5 \times 10^7$ | $5.7 \times 10^7$ | $5.4 \times 10^7$ | $3.0 \times 10^7$ |
| Rubbing resistance | C | C | C | C | C |
| Storage stability | B | C | C | C | C |

LEGEND

*1: Aqueous dispersion of carbon black (containing a resin dispersant); numeral in the table indicates the pigment solid component amount.
*2: "MOWINYL" is a registered trade mark of JAPAN COATING RESIN CO., LTD.; acrylic-based resin particles; manufactured by JAPAN COATING RESIN CO., LTD.; active ingredient: 46%; numeral in the table indicates the blending amount.
*3: "MOWINYL" is the registered trade mark of JAPAN COATING RESIN CO., LTD.; acrylic-based resin particles; manufactured by JAPAN COATING RESIN CO., LTD.; active ingredient: 43%; numeral in the table indicates the blending amount.
*4: "MOWINYL" is the registered trade mark of JAPAN COATING RESIN CO., LTD.; acrylic-based resin particles; manufactured by JAPAN COATING RESIN CO., LTD.; active ingredient: 20%; numeral in the table indicates the blending amount.
*5: "MOWINYL" is the registered trade mark of JAPAN COATING RESIN CO., LTD.; acrylic-based resin particles; manufactured by JAPAN COATING RESIN CO., LTD.; active ingredient: 46%; numeral in the table indicates the blending amount.
*6: "SAIVINOL" is a registered trade mark of SAIDEN CHEMICAL INDUSTRY CO., LTD.; acrylic-based resin particles; manufactured by SAIDEN CHEMICAL INDUSTRY CO., LTD.; active ingredient: 39%; numeral in the table indicates the blending amount.
*7: "JSR" is a registered trade mark of JSR Corporation; styrene-butadiene-based resin particles; manufactured by JSR Corporation; active ingredient: 51%; numeral in the table indicates the blending amount.
*8: "ADEKA BONTIGHTER" is a registered trade mark of ADEKA CORPORATION; urethane-based resin particles; manufactured by ADEKA CORPORATION; active ingredient: 34%; numeral in the table indicates the blending amount.
*9: "SAIVINOL" is the registered trade mark of SAIDEN CHEMICAL INDUSTRY CO., LTD.; acrylic-based resin particles; manufactured by SAIDEN CHEMICAL INDUSTRY CO., LTD.; active ingredient: 42%; numeral in the table indicates the blending amount.
*10: "MOWINYL" is the registered trade mark of JAPAN COATING RESIN CO., LTD.; acrylic-based resin particles; manufactured by JAPAN COATING RESIN CO., LTD.; active ingredient: 47%; numeral in the table indicates the blending amount.

As indicated in TABLE 1, the results of the evaluations of the rubbing resistance and the storage stability were all "B" or higher and satisfactory in each of Examples 1 to 11. Regarding Examples 1 and 9 to 11 of which components were similar to one another except for the difference in the storage elastic modulus E' at 25° C. of the ink film which was dried and solidified, in Examples 1 and 11 in which the storage elasticity modulus E' was not less than $2.1 \times 10^9$ Pa, the results of the evaluations of the rubbing resistance and the storage stability were all "A", and were more satisfactory than those in Examples 9 and 10 in which the storage elasticity modulus E' was not more than $2.1 \times 10^9$ Pa. Further, regarding Examples 1 to 5 in which the storage elastic modulus E' was not less than $9.7 \times 10^8$ Pa and of which components were similar to one another except for the difference in the Tg of the resin particles, Examples 1 to 3 using the resin particles of which Tg was not less than 49° C., the result of the evaluation of the storage stability were all "A", and were more satisfactory in the storage stability than those in Examples 4 and 5 using the resin particles of which Tg was less than 49° C.

On the other hand, as indicated in TABLE 1, in Comparative Examples 1 to 11, at least one of the results of the evaluations of the rubbing resistance and the storage stability was "C". In Comparative Example 1 which used the styrene-butadiene-based polymer, rather than using the acrylic-based polymer, and in Comparative Example 2 which used the urethane-based polymer, rather than using the acrylic-based polymer, both the results of the evaluations of the rubbing resistance and the storage stability were unsatisfactory. In Comparative Examples 3 and 4 in which the storage elastic modulus E' was not more than $9.7 \times 10^8$ Pa, the result of the evaluation of the rubbing resistance was unsatisfactory. In Comparative Examples 5 and 8 which used butyl triglycol as the glycol ether, the result of the evaluation of the rubbing resistance was unsatisfactory. Further, in Comparative Example 8, the result of the evaluation of the storage stability was also unsatisfactory. The mechanism by which the result of the evaluation of the storage stability of Comparative Example 8 was unsatisfactory is presumed, for example, that the blending amount of the resin particles was increased, as compared with Comparative Example 5, and thus the interaction with respect to the butyl triglycol as the solvent was amplified, thereby leading to the lowering in the storage stability. The present disclosure, however, is not restricted by this presumption in any way. In Comparative Example 6 which used 1,2-pentanediol as the diol, the result of the evaluation of the rubbing resistance was unsatisfactory. In Comparative Example 7 which used propylene glycol as the diol, the result of the evaluation of the rubbing resistance was unsatisfactory. In Comparative Example 9 which used tripropylene glycol monomethyl ether, rather than using the dipropylene glycol monopropyl ether, both the results of the evaluations of the rubbing resistance and the storage stability were unsatisfactory. In Comparative Example 10 which used dipropylene glycol monobutyl ether as the glycol ether, and in Comparative Example 11 which used the tripropylene glycol monobutyl ether as the glycol ether, both the results of the evaluations of the rubbing resistance and the storage stability were unsatisfactory.

Although a part or the entirety of each of Example and Comparative Examples may be also described as in the following addenda, the present disclosure is not limited to or restricted by the following addenda.

(Addendum 1) A water-based ink for ink-jet recording characterized by including: a pigment, resin particles, a solvent and water,
wherein the resin particles are resin particles of an acrylic-based polymer; and
a storage elastic modulus E at 25° C. of an ink film, of the water-based ink for ink-jet recording, which is dried and solidified is not less than $9.7 \times 10^8$ Pa.

(Addendum 2) The water-based ink for ink-jet recording according to Addendum 1, wherein the storage elastic modulus E at 25° C. of the ink film which is dried and solidified is not less than $2.1 \times 10^9$ Pa.

(Addendum 3) The water-based ink for ink-jet recording according to Addendum 1 or 2, wherein the solvent includes both of diol and glycol ether.

(Addendum 4) The water-based ink for ink-jet recording according to Addendum 3, wherein the diol is at least one of 1,2-hexanediol and 1,6-hexanediol.

(Addendum 5) The water-based ink for ink-jet recording according to Addendum 3 or 4, wherein the glycol ether includes not less than two kinds of the glycol ether.

(Addendum 6) The water-based ink for ink-jet recording according to Addendum 5, wherein one of the not less than two kinds of the glycol ether is dipropylene glycol monopropyl ether, and the other of the not less than two kinds of the glycol ether is at least one of propylene glycol monopropyl ether and propylene glycol monobutyl ether.

(Addendum 7) The water-based ink for ink-jet recording according to Addendum 6, wherein a blending amount of the solvent is in a range of 6% by weight to 10% by weight, and satisfies the following condition (X), $$B/A \leq 1, \quad \text{Condition (X):}$$

A: a blending amount (% by weight) of the dipropylene glycol monopropyl ether, and B: a blending amount (% by weight) of at least one of the propylene glycol monopropyl ether and the propylene glycol monobutyl ether.

(Addendum 8) A water-based ink for ink-jet recording including a pigment, resin particles, a solvent and water, wherein the resin particles are resin particles of an acrylic-based polymer; and the solvent includes both of diol and glycol ether.

(Addendum 9) The water-based ink for ink-jet recording according to Addendum 8, wherein the diol is at least one of 1,2-hexanediol and 1,6-hexanediol.

(Addendum 10) The water-based ink for ink-jet recording according to Addendum 8 or 9, wherein the glycol ether includes not less than two kinds of the glycol ether.

(Addendum 11) The water-based ink for ink-jet recording according to Addendum 10, wherein one of the not less than two kinds of the glycol ether is dipropylene glycol monopropyl ether, and the other of the not less than two kinds of the glycol ether is at least one of propylene glycol monopropyl ether and propylene glycol monobutyl ether.

(Addendum 12) The water-based ink for ink-jet recording according to Addendum 11, wherein a blending amount of the solvent is in a range of 6% by weight to 10% by weight, and satisfies the following condition (X), $$B/A \leq 1, \quad \text{Condition (X):}$$

A: a blending amount (% by weight) of the dipropylene glycol monopropyl ether, and B: a blending amount (% by weight) of at least one of the propylene glycol monopropyl ether and the propylene glycol monobutyl ether.

(Addendum 13) The water-based ink for ink-jet recording according to any one of Addenda 8 to 12, wherein a storage elastic modulus E at 25° C. of an ink film, of the water-based ink for ink-jet recording, which is dried and solidified is not less than $9.7 \times 10^8$ Pa.

(Addendum 14) The water-based ink for ink-jet recording according to Addendum 13, wherein the storage elastic modulus E at 25° C. of the ink film which is dried and solidified is not less than $2.1 \times 10^9$ Pa.

(Addendum 15) The water-based ink for ink-jet recording according to any one of Addenda 1 to 14, wherein the pigment is carbon black.

(Addendum 16) The water-based ink for ink-jet recording according to any one of Addenda 1 to 15, wherein a glass transition temperature of the resin particles is in a range of 24° C. to 80° C.

(Addendum 17) The water-based ink for ink-jet recording according to Addendum 16, wherein the glass transition temperature of the resin particles is not less than 49° C.

(Addendum 18) The water-based ink for ink-jet recording according to any one of Addenda 1 to 17, wherein a blending amount of the resin particles is in a range of 4.3% by weight to 5.0% by weight.

(Addendum 19) An ink-jet recording apparatus characterized by including: an ink storing section, and an ink discharging mechanism, the ink-jet recording apparatus being configured to discharge an ink stored in the ink storing section by the ink discharging mechanism;

the ink-jet recording apparatus further including a drying mechanism configured to heat and dry a record part by the ink discharged by the ink discharging mechanism, wherein the water-based ink for ink-jet recording as defined in any one of Addenda 1 to 18 is stored in the ink storing section.

(Addendum 20) The ink-jet recording apparatus according to Addendum 19, wherein the drying mechanism applies an amount of heat which is in a range of 44 J/cm³ to 131 J/cm³ to the record part by the ink.

(Addendum 21) An ink-jet recording method characterized by including:

a recording step of performing recording on a recording medium by discharging a water-based ink onto the recording medium in accordance with an ink-jet system; and a fixing step of fixing, to the recording medium, the water-based ink adhered to the recording medium in the recording step, by use of a drying mechanism configured to heat a record part of the recording medium, wherein the water-based ink for ink-jet recording as defined in any one of Addenda 1 to 18 is used, as the water-based ink, in the recording step.

(Addendum 22) The ink-jet recording method according to Addendum 21, wherein the fixing step uses the drying mechanism configured to heat the record part of the recording medium so as to apply an amount of heat in a range of 44 J/cm³ to 131 J/cm³ to the record part, to thereby fix the water-based ink to the recording medium.

(Addendum 23) The ink-jet recording method according to Addendum 21 or 22, wherein the recording medium is coated paper.

(Addendum 24) An ink storing container characterized by including a water-based ink for ink-jet recording, wherein the water-based ink is the water-based ink for ink-jet recording as defined in any one of Addenda 1 to 18.

As described above, the water-based ink of the present disclosure is fixable to the coated paper by the drying at a lower temperature and for a shorter period of time. The usage of the water-based ink of the present disclosure is not limited to the ink-jet recording on the coated paper, and is widely applicable to ink-jet recordings on a variety of kinds of recording medium, including plain paper, glossy paper, mat paper, etc.

What is claimed is:

1. A water-based ink for ink-jet recording comprising a pigment, resin particles, a solvent and water, wherein the resin particles are resin particles of an acrylic-based polymer; and a storage elastic modulus E' at 25° C. of an ink film, of the water-based ink for ink-jet recording, which is dried and solidified is in the range of $2.1 \times 10^9$ Pa to $7.3 \times 10^9$ Pa, a glass transition of the resin particles is in a range of 49° C. to 80° C., wherein the solvent includes both a diol and glycol ether, the diol is at least one of 1,2-hexanediol and 1,6-hexanediol, and the glycol ether is a combination of dipropylene glycol monopropyl ether and propylene glycol monopropyl ether or a combination of dipropylene glycol monopropyl ether and propylene glycol monobutyl ether, and blending amounts of A and B satisfy the following condition 0.8≤B/A≤1, with A: a blending amount (% by weight) of the dipropylene glycol monopropyl ether, and B: a blending amount (% by weight) of propylene glycol monopropyl ether or propylene glycol monobutyl ether, and with a blending amount of the solvent in a range of 6% by weight to 10% by weight of the water-based ink for ink-jet recording, whereby the water-based ink for ink-jet recording provides a stable image when a drying mechanism applies, with respect to 1 cm$^3$ of the ink, an amount of heat in a range of 44 J/cm$^3$ to 131 J/cm$^3$.

2. The water-based ink for ink-jet recording according to claim 1, wherein the pigment is carbon black.

3. The water-based ink for ink-jet recording according to claim 1, wherein a blending amount of the resin particles is in a range of 4.3% by weight to 5.0% by weight.

4. An ink-jet recording apparatus comprising an ink storing section and an ink discharging mechanism, the ink-jet recording apparatus being configured to discharge an ink stored in the ink storing section by the ink discharging mechanism, the ink-jet recording apparatus further comprising a drying mechanism configured to heat and dry a record part by the ink discharged by the ink discharging mechanism, wherein the water-based ink for ink-jet recording as defined in claim 1 is stored in the ink storing section.

5. The ink-jet recording apparatus according to claim 4, wherein the drying mechanism applies an amount of heat which is in a range of 44 J/cm$^3$ to 131 J/cm$^3$ to the record part by the ink.

6. An ink-jet recording method comprising:

a recording step of performing recording on a recording medium by discharging a water-based ink onto the recording medium in accordance with an ink-jet system; and a fixing step of fixing, to the recording medium, the water-based ink adhered to the recording medium in the recording step, by use of a drying mechanism configured to heat a record part of the recording medium, wherein the water-based ink for ink-jet recording as defined in claim 1 is used, as the water-based ink, in the recording step.

7. The ink-jet recording method according to claim 6, wherein the fixing step uses the drying mechanism configured to heat the record part of the recording medium so as to apply an amount of heat in a range of 44 J/cm$^3$ to 131 J/cm$^3$ to the record part, to thereby fix the water-based ink to the recording medium.

8. The ink-jet recording method according to claim 6, wherein the recording medium is coated paper.

9. An ink storing container comprising a water-based ink for ink-jet recording, wherein the water-based ink is the water-based ink for ink-jet recording as defined in claim 1.

* * * * *